Figure 1:
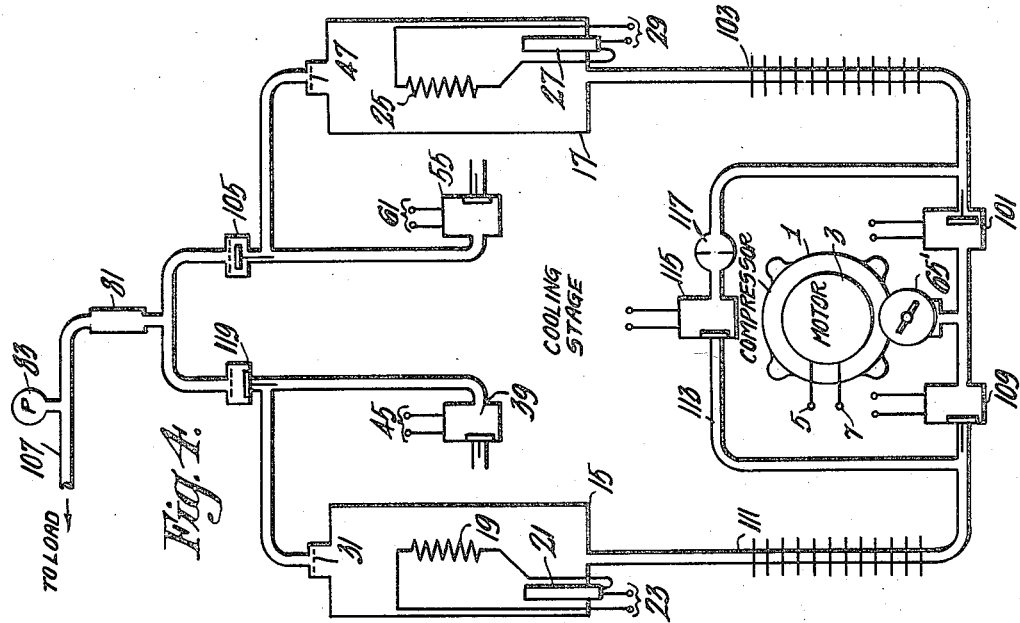

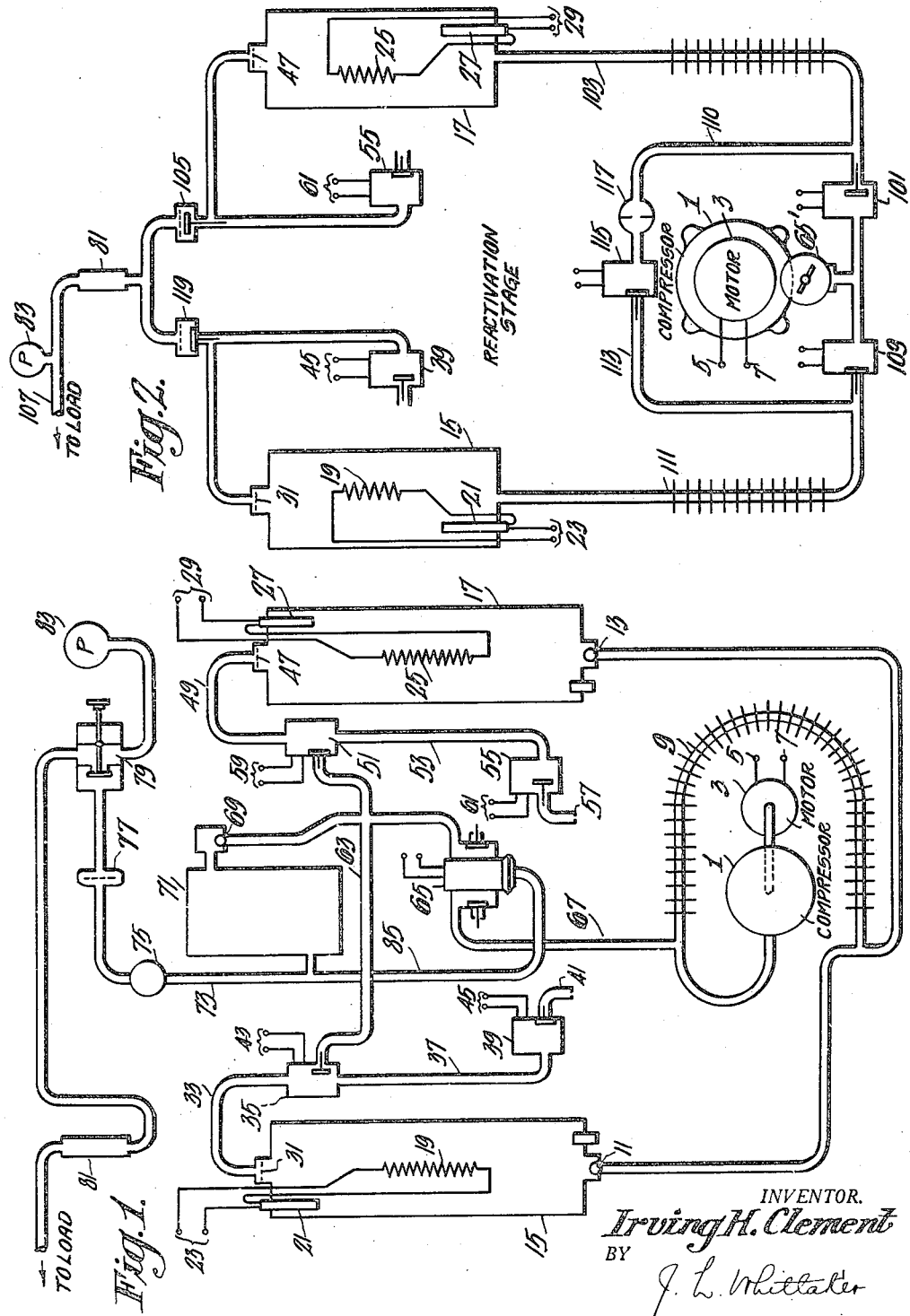

Jan. 17, 1950  I. H. CLEMENT  2,494,644
GAS DEHYDRATION SYSTEM
Filed March 20, 1945  3 Sheets-Sheet 2

INVENTOR.
Irving H. Clement
BY
J. L. Whittaker
ATTORNEY

Jan. 17, 1950 — I. H. CLEMENT — 2,494,644
GAS DEHYDRATION SYSTEM
Filed March 20, 1945 — 3 Sheets-Sheet 3

INVENTOR.
Irving H. Clement
BY
ATTORNEY

Patented Jan. 17, 1950

2,494,644

UNITED STATES PATENT OFFICE 2,494,644

GAS DEHYDRATION SYSTEM

Irving H. Clement, River Edge, N. J., assignor to Dielectric Products Company, Incorporated, a corporation of New Jersey Application March 20, 1945, Serial No. 583,779

4 Claims. (Cl. 183—4.1)

1

This invention relates generally to gas dehydration systems and, more particularly, to an improved method of and means for dehydrating gas in a continuous supply system where the flow of any gas may be either continuous, as, for example, through a pipe line or system with a large outlet or opening to the atmosphere, or intermittent, as, for example, through a pipe line or system having only slight gas leakage to the atmosphere. In the latter case the dehydration unit operates only intermittently to replace the dry gas which has leaked out of the system and thereby maintains the desired pressure in the line or system.

Heretofore, various types of gas dehydration systems have been employed for continuously supplying dehydrated gas under pressure to a load system such as a gas filled, coaxial signal transmission line. In such a signal transmission line, air or other gaseous dielectrics interposed between the coaxial conductors generally are dehydrated and maintained at a reasonably constant pressure to assure that the electrical characteristics of the transmission line remain constant under all operating conditions. A radical drop in the pressure inside the line would markedly decrease the flash-over voltage while moisture in the gas would both decrease the flash-over voltage and increase the current creepage over the surface of the insulators supporting the inner conductor. Under normal operating conditions, where the line is substantially gas-tight or leaks very slightly, only intermittent renewal of the gas dielectric is required in order to keep the desired pressure inside the line. In instances where the line joints may become leaky due to continuous vibration or where leaks develop due to other damage to the line, the dehydrator system is required to supply a continuous flow of dry gas through the line in sufficient quantity to maintain the desired pressure in the line and to assure at all times that dry gas escapes through the leaks out to the atmosphere and thereby prevents any humid atmosphere or air containing free moisture from entering the line through these leaky joints or damaged sections in the line.

Heretofore, some of the dry gas supply systems employed for this purpose have utilized the dehydration characteristics of active silica gel for absorbing moisture from atmospheric air. In one of such prior systems, two dehydration units containing silica gel are employed. Atmospheric air is compressed, by a diaphragm type pump, to a relatively high pressure and then is passed through one of these units as well as through a

2 gas storage chamber and a pressure reducing valve on its way to the transmission line. At the same time some of the air at the high pressure, from the same pump, is passed through the second of these units during an extended interval while heat is applied to vaporize the moisture which the silica gel in the second unit has adsorbed during a prior portion of the dehydration cycle. The heat and compressed air are applied simultaneously for a period of time sufficiently long to drive off all of the adsorbed moisture and to dry out all of the tubes and valves leading from the unit to the atmosphere. After this extended heating period, the second unit is allowed to cool back to room temperature and to remain idle until the first unit has been exhausted or used up. By means of suitable electrically or manually operated control valves, one dehydration unit is allowed to become completely restored to an active state while the other unit is furnishing dehydrated gas to the coaxial transmission line or other load system.

In a typical dehydration system of the type described, the compressor is required to supply air at the pressure of 30 pounds per square inch continuously for a period of seven hours to the dehydration unit that is being reactivated. The useful operative period of one of these dehydrating units in its active state is twelve hours and this constitutes one half cycle of operation of a program timer which controls the dehydrating system. During the last five hours of the half-cycle the compressor and the program timer motor start and stop at the demand of a pressure-responsive electrical switch. Therefore if the line is reasonably gas-tight the compressor will run only intermittently and the last five hours of operation may be extended over a period of several days. Thus it is seen that the compressor runs continuously for seven hours even though the line is not demanding a flow of dry air and then runs intermittently until the total time of compressor operation adds up to twelve hours. Actually the compressor runs the full twelve hours of the program timer half-cycle, seven hours continuously and five hours intermittently even though the transmission line is not leaking badly. Furthermore during normal operation, the line usually requires a pressure between 5 and 10 pounds per square inch. This means that the pressure of from 30 to 40 pounds per square inch inside the unit must be reduced to 5 or 10 pounds per square inch before the dried air enters the transmission line. The compressor is thus required to pump up to a cut-out pressure of about 40 pounds per square inch even though the line demands only 5 or 10 pounds per square inch. This high pressure operation greatly decreases the useful life of the piston diaphragms of the compressor and/or valves thereby requiring considerable maintenance.

The instant invention contemplates the use of a simplified dehydration system which requires no storage gas chamber and which requires that the compressor operate continuously for only twenty minutes during each reactivation period. This twenty-minute period is called the "purge period" for the reason that it cleans out all of the residual steam left in the system after the reactivation period. The "steaming out" of moisture in the inactive portion of the system is accomplished solely by the vapor pressure of the steam generated therein by an associated heater element. The total reactivation and purge time for this simplified unit is 3 hours and the total half-cycle of operation is 6 hours. Thus it is seen that for the case of supplying dry gas to a line having very little leakage, the compressor will run continuously for only twenty minutes out of the full half cycle. This means that out of 6 hours the compressor will actually run about 3½ hours when the line is not leaking badly. In other words, the useful compressor life will be lengthened by a factor of 1.71 due to this fact alone. Furthermore the instant invention requires no pressure reducing valve, that is, the dehydration system operates at the same pressure as required by the transmission line. If the line requires 10 pounds per square inch, the compressor pumps to 10 pounds per square inch only. This feature increases the life of the piston diaphragm by a factor of 2 or more, depending upon the pressure at which the line is operated. The total length of life of the compressor is thus increased by a factor of 3 or more by the instant invention. Thus the instant invention provides for dehydration unit requiring considerably less maintenance than typical prior art systems.

The outstanding features of the instant invention are: (1) the compressor is required to supply compressed gas to the inactive dehydration cell only during the time interval wherein the cell is being purged of residual steam after the "steaming-out" interval is completed during each half-cycle of operation, (2) no dry gas storage tank and pressure reducing valve are required, and (3) no air flow valve for reducing the output of the dehydration system during periods of extremely high temperature and relative humidity is required.

Among the objects of the invention are to provide an improved method of and means for dehydrating gases. Another object of the invention is to provide an improved method of and means for dehydrating gases in a continuous supply system. A further object of the invention is to provide an improved method of and means for dehydrating gases at relatively high pressure in a continuous supply system. An additional object of the invention is to provide an improved method of and means for dehydrating gases in a continuous supply system which includes alternately active and inactive dehydration units wherein gas under pressure is supplied to the inactive unit for only a relatively short gas purging interval thereby eliminating the obnoxious noise produced by a compressor running continuously for several hours. Another object of the invention is to provide an improved method of and means for reactivating a dehydration cell during an inactive interval subsequent to an active operational interval of said cell. Another object of the invention is to provide an improved method of and means for dehydrating gases in a continuous supply system with a minimum of actuating and control valve elements. A further object is to provide a continuous gas dehydration system actuated by a timing device. Another object is to provide a continuous gas dehydration system actuated selectively by a timing device and a pressure responsive device.

Figure 2:
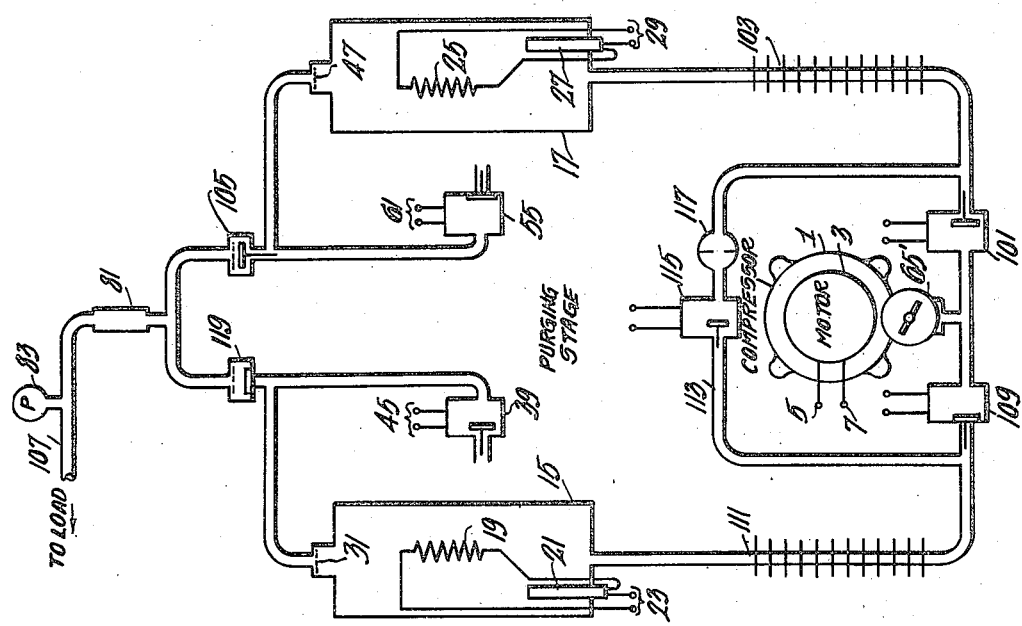
Figure 5:
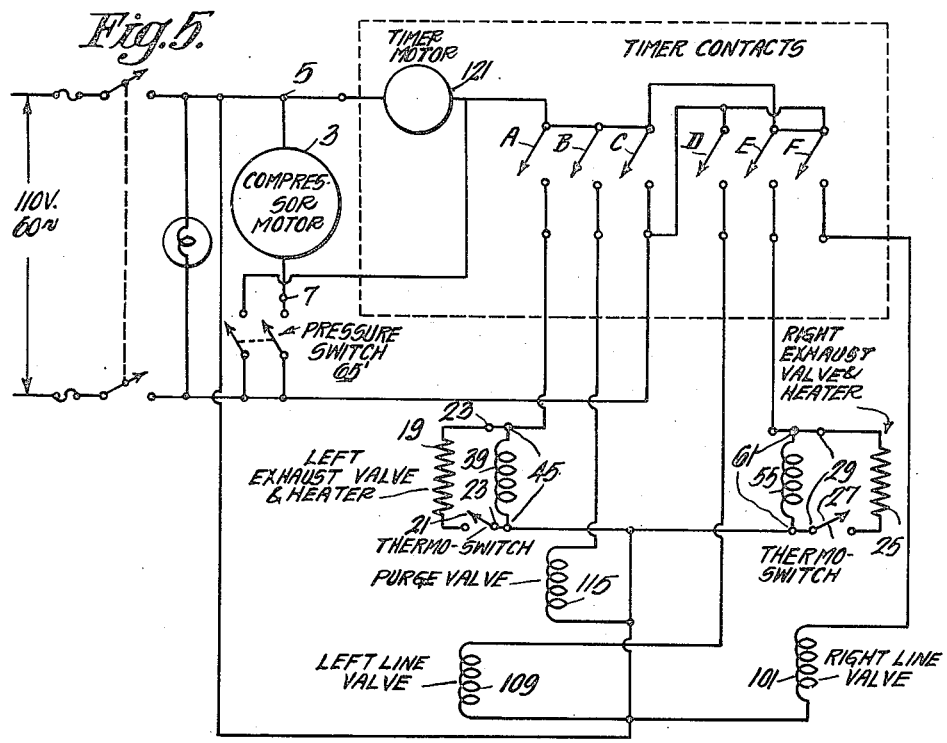
Figure 6:
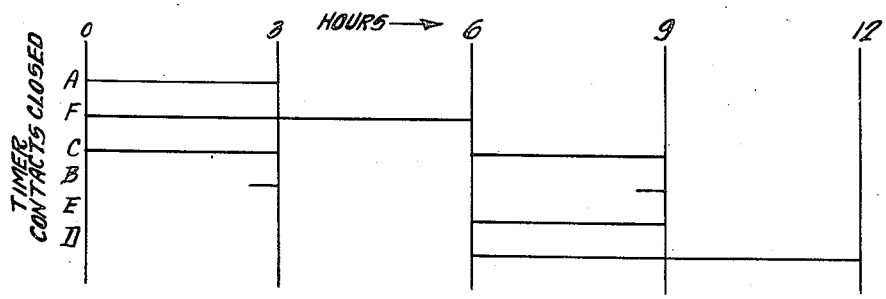

The invention will be described in greater detail by reference to the accompanying drawings of which Figure 1 is a schematic arrangement of a typical prior art system, Figures 2, 3 and 4 are schematic arrangements of a preferred embodiment of the invention, showing three successive operational stages comprising a full half-cycle of operation, Figure 5 is a schematic circuit diagram of the electrical connections of the instant system showing the connections between the timing device, gas compressor and actuating valve and heater mechanisms, and Figure 6 is a graph showing the operational phases of a complete cycle of operation. Similar reference characters are applied to similar elements throughout the drawings.

Referring to Figure 1 of the drawing, a typical prior art device includes a conventional gas compressor 1 operated, for example, by means of an electric motor 3 having power terminals 5, 7, wherein the compressor supplies atmospheric air or other gas under pressure to a gas cooling coil 9. The outlet of the cooling coil 9 is connected through suitable conduit to inlet check valves 11, 13 of a pair of dehydration cells 15, 17, respectively. The dehydration cells comprise gastight metallic cylinders which are substantially filled with silica gel or other dehydration compound. The first dehydration cell 15 includes a first heater element 19 having a thermostatic switch 21 connected in series with its electrical terminals 23. Similarly, the second dehydration cell 17 includes a second electrical heater element 25 have a second thermostatic switch 27 connected in series with its electrical terminals 29.

The output of the first dehydration cell 15 includes a gas filter 31 and an output conduit 33 which passes through a line valve 35 which has a by-pass section opening into a first venting conduit 37. The first venting conduit 37 opens into an exhaust valve 39 having an exhaust orifice 41. The line valve 35 and exhaust valve 39 each are magnetically operated and include electrical connections 43, 45 respectively.

Similarly, the output duct of the second dehydration cell 17 includes a gas filter 47 which opens into a second output conduit 49 which is connected to a second line valve 51 having a gas by-pass section to a second venting conduit 53. The second venting conduit 53 opens into a second exhaust valve 55 having an exhaust orifice 57. The second line and second exhaust valves 51, 55, respectively, also are magnetically operated and are provided with electrical terminals 59, 6¹ respectively.

The first and second line control valves 35 and 51 are connected through a control conduit 63 to a combination pressure switch and unloader valve 65. The unloader valve 65 also has a direct connection through a pressure conduit 67 to the intake side of the compressor cooling coil 9. The control conduit 63 also is connected through a third check valve 69 to a gas reservoir 71 which opens into a load conduit 73. The load conduit 73 includes a needle valve 75, a third gas filter 77, a reducing valve 79 and a moisture indicator 81. The load line thence provides dehydrated gas at suitable pressure to a coaxial line or other load system. If desired, a gas pressure gauge 83 may be connected to the load conduit adjacent the reducing valve 79, or at any other desired point. A conduit 85 is connected from the load line 73 to the pressure switch 65.

*Operation of prior art system*

The cycle of operation of the system is controlled jointly by a gas pressure electrical switch forming a portion of the unloader valve 65 and by an electrical timer mechanism of a conventional type, not shown.

In the case of continuous operation of the unit, for providing dehydrated gas under suitable pressure to the coaxial line or other load device, atmospheric air enters the compressor 1, passes through the compressor cooling coil 9 and also through the conduit 67 into the unloader valve 65. At the outlet of the cooling coil 9 the compressed air flow is divided into two channels, one of which passes through the left hand or absorbing side of the system, and the other of which passes through the right hand or reactivating portion of the system for the half-cycle of operation illustrated. The air flowing in the absorbing side of the system passes through the first check valve 11, enters the first dehydration chamber 15 and is dehydrated by the silica gel particles therein. The dry air leaves the dehydration chamber 15 through the dust filter 31 and passes through the open solenoid line valve 35, check valve 69, reserve air chamber 71, needle valve 75, air cleaner 77, reducing valve 79, and moisture indicator 81 to the load device. The pressure supplied to the load device is indicated by the pressure gauge 83.

Simultaneously, air flowing in the second channel at the outlet of the cooling coil 9 passes through the second check valve 13 into the second dehydration chamber 17, which is now being reactivated. Due to suitable operation of the timer mechanism, the second heater coil 25 generates steam in the second dehydration cell 17. The steam is forced out of the cell through the second air filter 47, the conduit 49, through the by-pass of the line valve 51 and through the open second exhaust valve 55 and second exhaust orifice 57. It should be noted that the second line valve 51 is in a closed condition.

The flow of air continues for a period of the order of seven hours through the second dehydration chamber 17. At the end of this period the second heater 25 is deenergized, the exhaust valve 55 is closed and the reactivated dehydration chamber 17 is permitted to cool. The first half-cycle of operation is completed at the end of an additional five hours when the second dehydration chamber is completely restored to an active state.

The timing mechanism thence operates the valve mechanisms so that a similar half-cycle is repeated in the opposite directions, whereby the first dehydration chamber 15 is reactivated and the second dehydration chamber 17 supplies dehydrated gas to the output load conduit. The second half of the operating cycle is complete at the end of an additional twelve-hour interval.

In systems wherein the coaxial line is reasonably gas tight, the pressure in the entire system is maintained at approximately thirty pounds per square inch, during reactivation, by the action of the exhaust orifices 57 or 41. This action permits continuous flow of air through the reactivating cell during the seven-hour reactivation period while, by means of a pressure reducing valve, maintaining suitable pressure in the output load line. After the completion of the seven-hour reactivation interval, the compressor delivers air only at the demand of the pressure switch 65 which controls the power for the entire unit. Consequently, the last five-hour interval of each half-cycle of operation may extend intermittently over a long interval such as several days, depending upon the gas leakage from the coaxial line.

Referring to Figures 2, 3, and 4, the instant invention comprises a much simpler and more efficient dehydration system which is illustrated in three separate stages of operation. Figures 2, 3, 4 are identical except for the operating conditions of the various control valves which control the operational sequence of the various portions of the system. It will be seen that the air storage chamber 71 and the pressure reducing valve 79 of prior systems have been deleted. The dehydration cells 15, 17 may be of similar type to those utilized in prior systems.

*The improved system*

The operating cycle of the instant invention may be most clearly indicated by considering first what happens when the dehydration system is operating to deliver dry air continuously to a badly leaking signal transmission line, and second, when the dehydration system is delivering dry air to a transmission line which is reasonably gas tight. Figures 2, 3 and 4 illustrate respectively the three principal stages which, combined, comprise a full half-cycle of operation of the improved system. Figure 5 shows the relative connections of the component parts of the dehydrator control elements into the electrical switching mechanism which controls the electric power energization of the motor, compressor, heaters and magnetic control valves.

In the first case, when the load transmission line is leaking badly, atmospheric air is drawn into the compressor 1, and delivered through a pressure switch 65', an open first line valve 101 and a first finned cooling line 103 into the second dehydrating cell 17. In the second dehydrating cell 17, the compressed air gives up moisture to the active silica gel contained in the cell. The dried air then passes out of the second dehydrating cell 17 through the air filter 47, second air check valve 105, the humidity indicator 81 and thence into the transmission line. The pressure indicator 83 is connected to the output conduit 107 to indicate transmission line gas pressure.

*Reactivation stage*

In Figure 2, during the "Reactivation stage" or the first two hours and 40 minutes that the air flows into the transmission line as described heretofore, the first exhaust valve 39 is open, the second exhaust valve 55 is closed, and the heater 19 in the first dehydration cell 15 is energized. The heater 19 heats accumulated moisture in the first dehydration cell 15, the steam thus produced, due to its own pressure, being driven out of the silica gel contained therein and passing out through the air screen 31, and first exhaust valve 39. The steaming out interval of the first dehydration cell 15 continues for the full reactivation period of two hours and 40 minutes.

The compressor 1 also is connected through the pressure switch 65' to a second line valve 109 and a second finned cooling conduit 111 to the first dehydration cell 15. During the reactivation period of the first dehydration cell 15, the second line valve 109 is closed. A by-pass line 113 connecting the intake sides of the first and second cooling lines 103 and 111 includes a magnetically operable purge valve 115 and a purge orifice 117. During the reactivation period, when the heater 19 is energized to steam-out the first dehydration cell 15, the purge valve 115 remains closed, hence the compressor need not operate except upon demand of the pressure switch 65' which is responsive to the pressure in the active portion of the system, and is dependent upon the degree of gas leakage from the load line.

Purging stage

Referring to Figure 3, at the end of the "reactivation period," the purge valve 115 opens and allows some of the air from the compressor to pass through the purge orifice 117, through the by-pass line 113 and the second cooling conduit 111 to purge the first dehydration cell 15 by blowing atmospheric air therethrough and further exhausting the cell through the exhaust valve 39. The purge valve 115 is held open for a period of about 20 minutes which is sufficient to purge the first dehydration cell of residual moisture that may have condensed on the tubing walls or in the valves.

Cooling stage

Referring to Figure 4, at the end of the purging period, the purge valve 115 and first exhaust valve 39 close and the first heater 19 is deenergized. Meanwhile, compressed air is permitted to flow through the second dehydration cell 17 to supply dry air to the coaxial line for an additional period of three hours, thus continuing the operation of the active portion of the system in the same manner as during the reactivation and purging periods. During this three-hour cooling period, the first dehydrating cell 15 is permitted to cool back to room temperature. The conclusion of the cooling period completes the first half cycle of operation of the system.

Second half-cycle of operation

At the beginning of the second half-cycle of operation the first line valve 101 closes and the second line valve 109 opens. Also the second exhaust valve 55 opens and the second heater 25 in the second dehydration cell is energized. Thus atmospheric air at suitable pressure is pumped through the reactivated first dehydration cell 15 wherein it is dried by the reactivated silica gel contained therein. The dry air passes out of the reactivated cell 15 through the air filter 31 therein. Meanwhile, the first check valve 105 has been closed and the second check valve 119 has been opened to permit dry air to pass from the first dehydration cell 15 through the humidity indicator 81 to the coaxial line conduit 107. Simultaneously, energization of the second heater 25 in the inactive dehydration cell 17 steams out the cell, exhausting the steam by its own vapor pressure through the open second exhaust valve 55. The reactivation, purge and cooling periods of the second dehydration cell 17 are similar to those for the first cell 15 during the first half-cycle of operation described heretofore. Thus a complete cycle of operation wherein both dehydrating cells are employed successively to provide dry air to the coaxial line requires a total period of 12 hours. However, it is emphasized that compressed air is supplied to the inactive dehydration cell only during approximately twenty minutes of each half-cycle comprising the purging period thereof.

In the second case, when the transmission line is reasonably gas-tight, atmospheric air at suitable pressure from the compressor 1 is delivered to the transmission line through the active side of the system in the same manner as described heretofore. As usual, the compressor operates until the pressure in the transmission line reaches the cut-out pressure of the pressure switch 65', but, during the reactivation and purge periods, when the pressure switch 65' cuts out, it deenergizes only the compressor motor 3. Meanwhile, the timing mechanism operates continuously during the reactivation and purge periods. Therefore, regardless of the line pressure, the appropriate heater element is energized to "steam out" the inactive dehydration cell and the appropriate exhaust valve is open during the reactivation and purge periods of said cell.

Also, at the beginning of the purge period, the purge valve 115 opens to allow air to escape from the active to the inactive side of the system whether or not the compressor is operating, and to pass through the purge orifice 117 to provide air under suitable pressure for purging the inactive cell. When the escape of air through the purge orifice 117 causes the pressure in the active dehydration cell to drop below the cut-in value of the pressure switch 65', the compressor motor again is energized by the action of the pressure switch. By suitable selection or adjustment of the purge orifice and pressure switch, the compressor may be required to operate only intermittently during the purge period. At the end of the purge period the heater element in the inactive dehydration cell is deenergized, and the approproate exhaust valve and purge valve are closed. Thereafter the timer motor is operated under control of the pressure switch 65' and the compressor and timer operate only when the coaxial line pressure drops below the predetermined cut-out pressure of the pressure switch. Thus the three-hour cooling period for the inactive cell may extend over a period of days depending upon the gas-tight characteristics of the transmission line.

After the timer motor has actually run for a full six hours, including the reactivation, purge and cooling periods for the inactive cell, the second half of the cycle is repeated as described heretofore. The second half of the cycle may extend for a different total time period, but in any event, corresponds to six hours of timer motor operation.

Figure 5 shows the electrical connections of the compressor motor, pressure switch, timer motor, timer contacts, heater elements and magnetic control valves to accomplish the cyclic operation described heretofore.

The graph of Figure 6 indicates the time intervals during which each of the contacts of the timer mechanism remain closed to accomplish the required operation of the various elements of the system. For example, referring to Figures 5 and 6, it will be seen that during the first three-hour "reactivation" period for the first dehydration cell 15, the timer contacts A, C and F are closed. Closing of contact A opens the first exhaust valve 39 and energizes the first heater 19. Simultaneously therewith, closing of the contact C energizes the timer motor 121, to commence the timing of the "reactivation" interval of the first half of the operational cycle. At the same time the contact F is closed which opens the first line valve 101. This contact condition continues for a period of two hours and 40 minutes at which time, contact B also is closed, thereby opening the purge valve 115 to purge the first dehydration cell 15. At the expiration of a 20-minute interval, contacts A, C and B are opened, and contact F remains closed for an additional three-hour period during which the first line valve 101 remains open. During this second three-hour period the timer motor is energized only in response to operation of the pressure switch 65', whereby said second three-hour interval of operation may actually continue for a much longer period depending upon the gas-tight characteristics of the coaxial line. The closing of the pressure switch also controls the operation of the compressor motor 3 as described heretofore.

At the conclusion of the first six hours of actual timer motor operation, contact F is opened and the second half of the operational cycle commences. Contacts C, E, and D are closed for a period of three hours whereby the timer motor 121 again is energized, the second exhaust valve 55 is opened and the second heater element 25 in the second dehydration cell 17 is energized. Also the first line valve 101 is closed and the second line valve 109 is opened, thereby permitting dehydrated air to be supplied to the coaxial line through the first dehydration cell 15.

At the conclusion of an additional two hours and 40 minutes, contact B also is closed for a period of 20 minutes, thereby opening the purge valve 115 to purge the second dehydration cell 17. At the conclusion of the third three-hour interval, contacts C, B and E are opened thereby deenergizing the timer motor, closing the purge valve 115 and also closing the second exhaust valve 55 and deenergizing the second heater element 25.

Thence the only contact remaining closed for the fourth three-hour interval is contact D which continues to energize and hold open the second line valve 109. Thus the operation of the timer motor 121 during the fourth three-hour operational period is under control of the pressure switch 65' which energizes the timer motor only when the compressor is in operation. As in the second quarter of the operational cycle, the fourth three-hour operational period actually may extend over a much longer time interval depending upon the demand placed on the system for gas replenishment of the coaxial line due to leakage.

It should be understood that during the periods when the contacts A or E are closed, the heater elements 19 or 25 will be selectively energized in response to operation of the thermostatic switches 21, 27 respectively, in order to prevent over-heating of the dehydration cells 15, 17.

Thus the invention described and claimed herein comprises a simplified dual channel dehydration system wherein a continuous supply of dehydrated gas may be furnished to a load, and wherein one channel is reactivated while the other channel is supplying dehydrated gas. During the reactivation period, the inactive cell is steamed out due to steam pressure generated therein, then the cell is purged for a relatively short interval by compressed gas derived from the remainder of the system. At the conclusion of the purging interval the inactive cell is gas sealed and permitted to cool to room temperature. At the conclusion of the reactivation, purging and cooling intervals, suitable valving means responsive to a conventional timer mechanism are operated to furnish dehydrated air through the reactivated cell and reactivate the remaining cell which heretofore has been supplying dehydrated gas.

I claim as my invention:

1. The method of furnishing dehydrated gas under pressure for special purposes, such as for a co-axial radio-transmission line, through the medium of a pair of dehydrating cells connected to the line and which cells contain an adsorbent material, the cells also being connected to a compressor of a suitable gas such as air, which consists in reactivating one of said cells while the other is delivering dehydrated gas to the load, said reactivation comprising the following steps, first closing off the cell from the source of compressed gas, then heating the adsorbent material inside the cell for a predetermined time to drive off under its own pressure the accumulated moisture therein, then purging the cell by forcing a suitable gas therethrough for a very short interval of time, then shutting off the gas and heat and allowing the cell to cool so as to be ready to be connected to said line while the other cell is reactivated.

2. The method of furnishing dehydrated gas under pressure for special purposes, such as for a co-axial radio transmission line, through the medium of a pair of dehydrating cells connected to the line and which cells contain an adsorbent material, the cells also being connected to a compressor of a suitable gas such as air, which consists in reactivating one of said cells while the other is delivering dehydrated gas to the loads, said reactivation comprising the following steps, first, closing off the cell from the source of compressed gas, then heating the adsorbent material from inside the cell for a period of time ranging from two to three hours to drive off under its own pressure the moisture within the cell and adsorbent material, then purging the cell by forcing a suitable gas therethrough for a short period of time ranging around twenty minutes, then shutting off the gas and heat and allowing the cell to cool.

3. A gas dehydration system composed of a gas compressor, a load controlled pressure switch connected to the output of the compressor, a pair of dehydration cells, each having its intake directly connected to said pressure switch through an electrically operated line control valve, a shunt around said control valves including an electrically operable purge valve and an orifice, each cell having its output connected directly to an electrically operated exhaust valve and to a check valve the latter of which are connected in parallel to the load line, each cell having an internal electrical heater and governing thermostat and a timing device to control the periods of operation of the system.

4. A gas dehydration system as set forth in claim 3 further defined in general in that the apparatus system is adjustable to work in two half cycles of three periods each, said periods comprising a "reactivation stage" of approximately two hours and forty minutes, a purging stage of about twenty minutes followed by a cooling stage of approximately three hours, said stages being carried out substantially as defined herein.

IRVING H. CLEMENT.

(References on following page)

REFERENCES CITED

The following references are of record in the file of this patent:

UNITED STATES PATENTS

| Number | Name | Date |
|---|---|---|
| 870,546 | Cooke | Nov. 12, 1907 |
| 1,092,434 | Daubine | Apr. 7, 1914 |
| 1,872,783 | Miller | Aug. 23, 1932 |
| 1,887,589 | Farmer | Nov. 15, 1932 |
| 2,075,036 | Hollis | Mar. 30, 1937 |
| 2,083,732 | Moore | June 15, 1937 |
| 2,101,555 | Moore | Dec. 7, 1937 |
| 2,259,749 | Hunsicker | Oct. 21, 1941 |
| 2,322,603 | Thumin | June 22, 1943 |